Figure 1:

March 26, 1957 J. H. STEWART ET AL 2,786,772
METHOD OF MAKING A CELLULAR CLAY AGGREGATE
Filed Jan. 19, 1953 2 Sheets-Sheet 1

INVENTORS
John H. Stewart and
BY Floyd W. Wack
Frease & Bishop
ATTORNEYS

United States Patent Office 2,786,772
Patented Mar. 26, 1957

2,786,772

METHOD OF MAKING A CELLULAR CLAY AGGREGATE

John H. Stewart, Canton, and Floyd W. Wack, Louisville, Ohio, assignors to Stark Ceramics, Inc., Canton, Ohio, a corporation of Ohio Application January 19, 1953, Serial No. 331,803

12 Claims. (Cl. 106—40)

The invention relates to cellular, burned clay globules for use as an aggregate in concrete, and the like, and to a novel method by which the same are made.

An ideal and most desirable aggregate for such purposes should be in the form of pellets or globules of suitable size, as light in weight as may be consistent with the required strength, and substantially non-absorbing. To this end it has been discovered that the above characteristics may be obtained in burned clay pellets or globules of cellular structure characterized by a multiplicity of non-communicating cells and provided with a sealing coating, whereby each pellet or globule will be impervious to penetration of moisture.

We have discovered that a light weight cellular aggregate having the above desirable qualities can be made by adjusting and firebloating preformed pellets of certain ceramic earths including refractory clays. In making such aggregate, natural clays may be adjusted in composition according to our invention, or we may use mixtures of two or more of such ceramic earths, mixtures of minerals and mixtures of oxides, or sources of oxides, adjusted in composition to the ranges which we have found desirable.

For this purpose, clays composed substantially of silica, alumina and suitable fluxing oxides in proper proportions, are satisfactory. Such fluxing oxides may comprise alkali metal oxides, alkali earth oxides and the oxides of iron and titanium, or the fluxing oxides may be derived from alkali metal salts, alkaline earth metal salts and iron and titanium salts. Although any salts of the desired metals are satisfactory as sources of the metal oxides, we prefer to use either the oxides themselves or such salts as the metal carbonates or metal silicates. Even though no oxide is present in the metal salt itself, the metal salt is formed when the clay is fired in an oxidizing atmosphere.

Such clays should be adjusted so that the constituents are present in the following range:

| | Percent |
|---|---|
| Silica | 50 to 75 |
| Alumina | 12 to 35 |
| Water, chemically combined | 1 to 20 |
| Fluxing oxides | 10 to 18 |

The percentage of the fluxing oxides, stated above, and throughout the specification and claims, refers to the equivalent oxide and not to the salt from which the oxide is formed.

Natural clays, including fireclays and other refractory clays contain sufficient gas evolving materials to cause firebloating. This gas may be supplied from chemically combined water, carbon, carbonates, sulphides, sulfates and iron oxide.

Natural clays, including fireclays and other refractory earths may be adjusted to the desirable ranges above pointed out. Although clays frequently need additional fluxing oxides, some clays may be too high in fluxing oxides, in which case the excess may be removed by leaching with water or dilute acids.

It is an object of the invention to produce an aggregate consisting of burned ceramic, cellular globules having a glassy, impervious coating.

Another object is to provide a novel method for forming such aggregate.

A further object is to provide a method adjusting ceramic earths to the desired composition whereby it may be fired to produce such cellular, coated globules.

A still further object is the provision of a method which includes the preforming of pellets of the desired clay composition and the burning thereof under such condition as to form cellular, glass coated ceramic globules.

Another object is the provision of a method of furnace or kiln operation for producing the desired product.

Figure 2:
Figure 3:
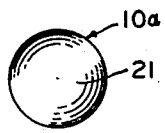
Figure 4:
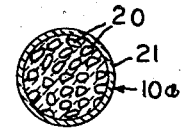
Figure 5:
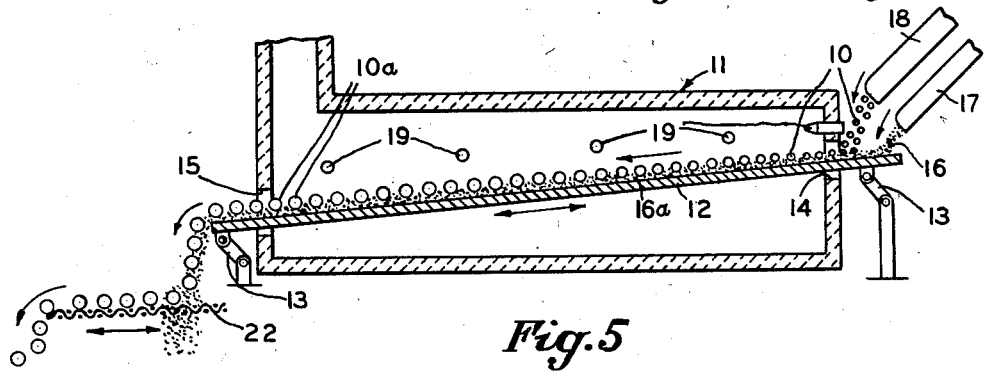
Figure 6:
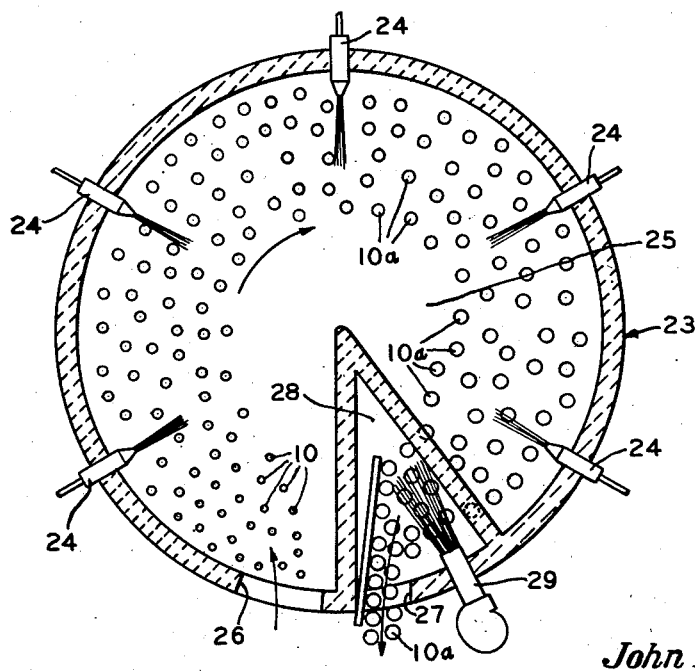
Figure 7:
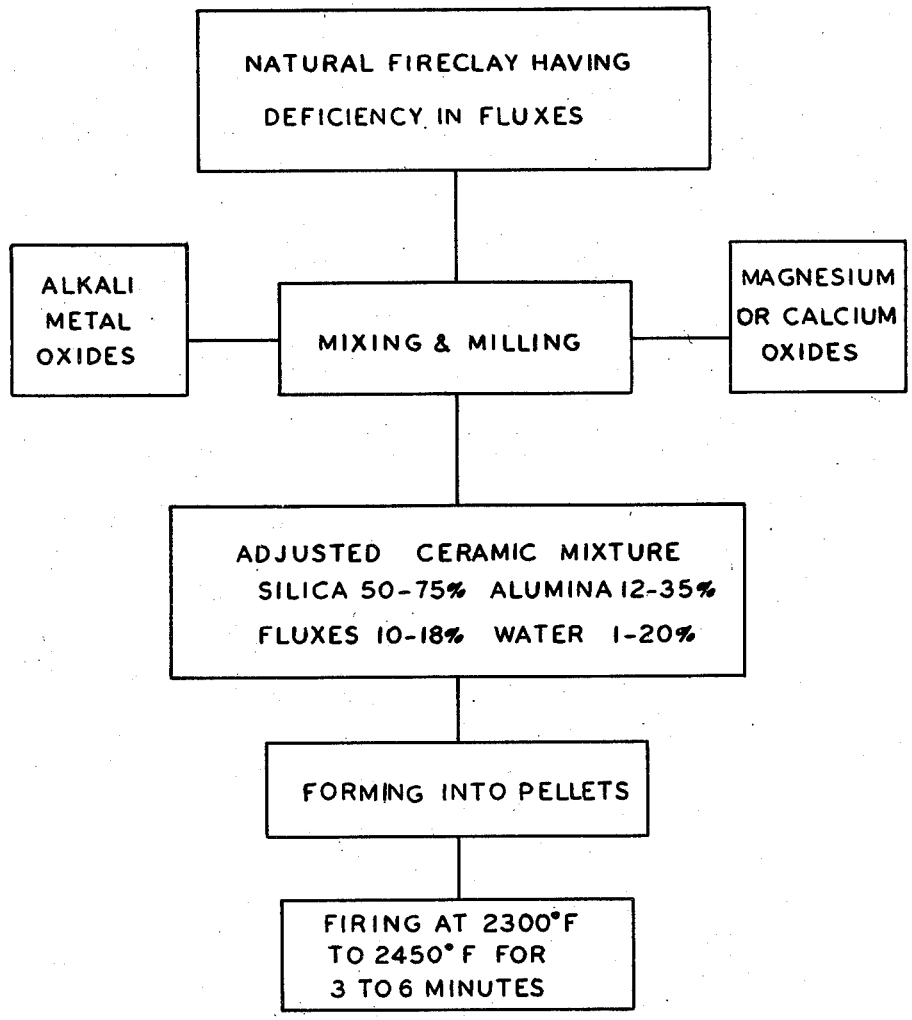

The above objects together with others which will be apparent from the drawing and following description, or which may be later referred to, may be attained by carrying out the novel method for forming the cellular globules in the manner hereinafter described in detail and illustrated in the accompanying drawing, in which:

Fig. 1 is an elevation considerably enlarged, of one of the preformed pellets of the adjusted ceramic mixture, before burning;

Fig. 2, a section through the pellet shown in Fig. 1;

Fig. 3, an elevation of one of the globules produced by firing a pellet such as shown in Figs. 1 and 2;

Fig. 4, a section through one of the fired globules, showing the cellular interior and glass coating;

Fig. 5, a schematic, longitudinal section through a furnace or kiln with shaker hearth, showing the manner in which the firing of the pellets may be carried out therein;

Fig. 6, a schematic, plan section of a furnace or kiln with rotary hearth and cooling chamber, showing the manner in which the firing operation may be carried out therein; and, Fig. 7, a flow sheet showing one preferred embodiment of a process embodying the invention.

The process may be carried out by grinding a ceramic earth if necessary, adding if necessary sufficient moisture to permit the same to be preformed into pellets of suitable size, and then firing at a sufficiently high temperature to cause the pellets to rapidly firebloat so that each pellet is considerably enlarged and the interior thereof is filled with small cells, while a glassy outer surface or coating is formed upon each globule entirely sealing the same.

The preforming of the pellets may be produced by adding only enough water to the ceramic earth so that in the milling operation particles of the moistened earth will adhere together forming pellets of irregular shapes and sizes, or, if desired, the ceramic earth may be sufficiently moistened to permit pellets or regular size and shape to be formed in any conventional type of machine for rolling balls or spheres.

The ceramic material should contain 50 to 75% silica, 12 to 35% alumina, and 10 to 18% fluxes and 1 to 20% water, before firing, and if natural ceramic earth as mined does not have a composition within these ranges, it may be adjusted so that its composition falls within the preferred ranges.

In case the natural ceramic earth available for the process has a deficiency in fluxes, such as in many natural refractory fireclays, it may be adjusted by the addition of alkali metal oxides and oxides of magnesium or calcium. For the purpose of illustration only, and with no intention of limiting the invention, the process is described in detail as carried out with the use of such a refractory fire clay ceramic earth.

*Example*

A very satisfactory light weight aggregate, comprising cellular globules with a glassy outer coating, has been produced from Lower Kittanning No. 5 fireclay, mined at East Canton, Ohio. A typical analysis of such fireclay is as follows:

| | |
|---|---|
| Moisture | 1.95 |
| $SiO_2$ (silica) | 60.10 |
| $Al_2O_3$ (alumina) | 24.40 |
| $Fe_2O_3$ (ferric oxide) | 2.15 |
| $TiO_2$ (titania) | 0.70 |
| $P_2O_3$ (phosphoric oxide) | 0.01 |
| CaO (lime) | .20 |
| MgO (magnesia) | 0.04 |
| $K_2O$ (potassium oxide) | 1.57 |
| $Na_2O$ (sodium oxide) | 0.18 |
| C (carbon) | 0.55 |
| $SO_3$ (sulphuric oxide) | 0.45 |

Such fireclay has a deficiency in fluxes, and is mixed and milled with sufficient quantities of alkali metal oxides and magnesium or calcium oxides to bring the adjusted ceramic mixture within the preferred ranges.

For reasons of economy, dolomite and soda ash (sodium carbonate) were used. Dolomite is a natural mixed carbonate of magnesium and calcium, and is the cheapest and most readily obtainable source of MgO. Dolomite comprises approximately 54% calcium carbonate and 46% magnesium carbonate by weight, and thus contains about 35% CaO and 20% MgO with the balance chiefly $CO_2$. Considerable deposits of dolomite of substantially the above analysis are located near important fireclay deposits in Ohio.

The constituents were mixed together in the following proportions:

| | Percent |
|---|---|
| Lower Kittanning No. 5 fireclay | 86 |
| Dolomite | 8 |
| Soda ash (sodium carbonate) | 6 |

This adjusted ceramic mixture, coming within the preferred ranges, is milled so that preferably the largest particles are 14 mesh while the smallest will be practically dust or air float. If only a minimum amount of moisture is added to the mixture, pellets may be formed in the mixing and milling operation. If, however, it is desired to form pellets of desired size and shape, a greater amount of water may be mixed with the adjusted ceramic earth mixture, to produce a plastic mass which may be formed into balls or spheres of desired size by means of a conventional type of ball rolling machine.

Pellets such as indicated at 10 are thus formed from the adjusted ceramic mixture. As shown in Fig. 2, these pellets are solid throughout, being composed of closely packed particles of the ceramic earth mixture, adhered or pressed together.

In order to transform these pellets into cellular globules, the pellets are subjected to the maximum temperature required to immediately firebloat each pellet, in the case of the mixture of Lower Kittanning No. 5 fireclay and fluxes given above, the preferred temperature being from 2300° F. to 2450° F.

This may be accomplished by charging the preformed pellets into a kiln or furnace at the maximum temperature, a kiln or furnace which is suitable for the purpose being shown in Fig. 5. The kiln is indicated generally at 11, and comprises an elongated chamber having an inclined, shaker hearth 12 extending longitudinally therethrough. Any conventional means, such as indicated at 13, may be provided for longitudinally reciprocating the shaker hearth 12. One end of the shaker hearth may extend through the charging opening 14 of the kiln and the other end thereof through the discharge opening 15.

Sand, as shown at 16, may be continually charged onto the charging end of the shaker hearth from a chute or spout 17 leading from a suitable supply of sand. By means of the continual reciprocation of the shaker hearth, the sand is distributed over the entire length thereof, forming a bed 16a of sand thereon.

The preformed pellets 10 are charged onto this bed of sand, at the charging end of the kiln or furnace, through a chute or trough 18, and are carried forwardly and downwardly along the hearth toward the discharge end thereof.

The kiln or furnace is maintained at proper temperature for rapidly transforming the pellets into cellular globules, in this case at a temperature of 2300° F. to 2450° F. This temperature may be somewhat higher or lower, as required for other ceramic earths or adjusted ceramic earth mixtures.

Burners or other suitable heating means, indicated at 19, are provided in the furnace chamber for maintaining the desired temperature. In actual practice in carrying out the process with the above described adjusted ceramic earth mixture, the temperature of the crown and hearth of the furnace were maintained at 2400° F. and down to 2300° F., while the flame sweep was higher.

The continuous shaking movement of the hearth 12 causes a continuous forward and downward movement of the sand bed 16a and pellets 10 thereon, in the direction of the arrow shown in Fig. 5. As the pellets are immediately subjected to the maximum temperature, upon charging into the kiln, they are very rapidly heated up, and within about 1 minute they become incandescent and quickly bloat to considerably larger size.

Within a matter of a few minutes the pellets 10 are transformed into cellular globules, such as shown in detail in Figs. 3 and 4, each having a multiplicity of uncommunicating cells 20 throughout its interior, caused by the gas evolving constituents in the mixture. A glassy coating 21 is formed upon the exterior of each globule, completely sealing the same, by the large silica content of the mixture.

As the globules 10a reach the discharge end of the hearth they pass through the discharge opening 15 of the kiln or furnace and, together with the sand, drop by gravity from the end of the hearth. The globule 10a and sand may be discharged upon a shaker screen, the sand passing through the screen and the globules being discharged from one end thereof into any suitable container.

The highly heated globules are kept separate from each other by means of the sand bed, until they pass out of the furnace atmosphere and are rapidly cooled below the fusion temperature before they come into contact with each other. Thus the globules are prevented from fusing together in a mass.

The entire firing takes only a very few minutes; very satisfactory results having been obtained by maintaining the pellets at a temperature approximately 2400° F. for about three minutes. The maximum time that the pellets have been submitted to the furnace temperature has been a little less than six minutes.

In Fig. 6 is shown a rotary hearth furnace in which the process may be carried out. The furnace is indicated generally at 23, and has burners or equivalent heating means 24. The hearth 25 rotates in the direction of the arrow.

Pellets 10 are charged through the charging opening 26, onto the hearth and are carried around in a clockwise direction, as viewed in Fig. 6, rapidly becoming incandescent and firebloated, so that they are quickly transformed into cellular globules 10a of a construction as above described and shown in Figs. 3 and 4.

As the globules on the hearth 25 approach the discharge opening 27, they pass into the cooling chamber 28, cooled as by the blower 29, when they are quickly brought down to a point below the fusion temperature (approximately 2200° F.) before they are discharged from the furnace, thus preventing the hot globules from fusing together.

Cellular globules formed in this manner have a specific gravity less than 1, and will float indefinitely upon water, as the glassy coating 21 completely seals the interior of each globule, preventing water from entering the cells 20.

Where natural ceramic earth having an excess of fluxes, and natural refractory fireclay having a deficiency of fluxes, are both obtainable, they may be mixed together in proper proportions to produce an adjusted ceramic mixture coming within the preferred range. Pellets may be formed from this adjusted mixture and the process carried out as above described.

Where a natural ceramic earth having an excess of fluxes is available, the same may be adjusted to the preferred range by leaching with water or dilute acid, and then proceeding as above described.

From the above it will be obvious that light weight, cellular, non-absorbing globules for use as aggregate may be quickly and economically produced by the novel method herein described.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

We claim:

1. The process of making ceramic globules having non-communicating multicellular interiors and glassy exteriors, which comprises producing a ceramic earth material having from 50% to 75% by weight silica, from 12% to 35% by weight alumina, from 1% to 20% by weight chemically combined water and from 10% to 18% by weight fluxing oxides present in fluxes selected from the group consisting of alkali metal oxides, alkaline earth metal oxides, oxides of iron and titanium, alkali metal salts, alkaline earth metal salts, and salts of iron and titanium in which calcium oxide and magnesium oxide are present, reducing the size of the particles of said ceramic earth material to a size ranging from 14 mesh to air float, forming pellets of the mixture, subjecting the pellets to a temperature of from 2300° F. to 2450° F. for a period of from three to six minutes to cause each pellet to be fire-bloated with a glassy exterior.

2. The process of making ceramic globules having non-communicating multicellular interiors and glassy exteriors, which comprises producing a ceramic earth material having from 50% to 75% by weight silica, from 12% to 35% by weight alumina, from 1% to 20% by weight chemically combined water and from 10% to 18% by weight fluxing oxides present in fluxes selected from the group consisting of alkali metal oxides, alkaline earth metal oxides, oxides of iron and titanium, alkali metal salts, alkaline earth metal salts, and salts of iron and titanium in which calcium oxide and magnesium oxide are present, reducing the size of the particles of said ceramic earth material to a size ranging from 14 mesh to air float, forming pellets of the mixture, subjecting the pellets to a temperature of from 2300° F. to 2450° F. for a period of from three to six minutes to cause each pellet to be fire-bloated with a glassy exterior maintaining the pellets separated from each other on a bed of sand while at said temperature and cooling below 2000° F.

3. The process of making ceramic globules having non-communicating multicellular interiors and glassy exteriors, which comprises mixing about 86% of a fireclay containing 50 to 75% by weight silica, 12 to 35% by weight alumina and 1 to 20% by weight chemically combined water, with about 8% by weight dolomite and about 6% by weight soda ash, reducing the size of the particles of said mixture to a size ranging from 14 mesh to air float, forming pellets of the mixture, subjecting the pellets to a temperature of 2300° F. to 2450° F. to fuse the material for a period of not more than 6 minutes to cause each pellet to be firebloated with a glassy exterior, maintaining the pellets separated from each other on a bed of sand while at said temperature.

4. The process of making ceramic globules having non-communicating muticellular interiors and glassy exteriors, which comprises mixing about 86% of a fireclay containing 50 to 75% by weight silica, 12 to 35% by weight alumina and 1 to 20% by weight chemically combined water, with about 8% by weight dolomite and about 6% by weight soda ash, reducing the size of the particles of said mixture to a size ranging from 14 mesh to air float, forming pellets of the mixture, subjecting the pellets to a temperature of 2300° F. to 2450° F. to fuse the material for a period of not more than 6 minutes to cause each pellet to be firebloated maintaining the pellets separated from each other on a bed of sand while at said temperature, and immediately cooling below the fusion temperature.

5. The process of making ceramic globules having non-communicating multicellular interiors and glassy exteriors, which comprises mixing about 86% of a fireclay containing 50 to 75% by weight silica, 12 to 35% by weight alumina and 1 to 20% by weight chemically combined water, with about 8% by weight dolomite and about 6% by weight soda ash, reducing the size of the particles of said mixture to a size ranging from 14 mesh to air float, forming pellets of the mixture, subjecting the pellets to a temperature of from 2300° F. to 2450° F. for a period of from three to six minutes to cause each pellet to be fire-bloated with a glassy exterior.

6. The process of making ceramic globules having non-communicating multi-cellular interiors and glassy exteriors, which comprises mixing about 86% of a fireclay containing 50 to 75% by weight silica, 12 to 35% by weight alumina and 1 to 20% by weight chemically combined water, with about 8% by weight dolomite and about 6% by weight soda ash, reducing the size of the particles of said mixture to a size ranging from 14 mesh to air float, forming pellets of the mixture, subjecting the pellets to a temperature of from 2300° F. to 2450° F. for a period of from three to six minutes to cause each pellet to be fire-bloated with a glassy exterior maintaining the pellets separated from each other on a bed of sand while at said temperature and immediately cooling below 2000° F.

7. The process of making ceramic globules having non-communicating multi-cellular interiors and glassy exteriors, which comprises mixing about 86% of a fireclay containing about 60.10% $SiO_2$, about 24.40% $Al_2O_3$, about 2.15% $Fe_2O_3$, about .70% $TiO_2$, about 0.01% $P_2O_5$, about 0.20% CaO, about 0.04% MgO, about 1.57% $K_2O$, about 0.18% $Na_2O$, about 0.55% C, about 0.45% $SO_3$ and about 1.95% moisture, with about 8% dolomite and about 6% soda ash, reducing the size of the particles of said mixture to a size ranging from 14 mesh to air float, forming pellets of the mixture, subjecting the pellets to a temperature of 2300° F. to 2450° F. to fuse the material for a period of not more than 6 minutes to cause each pellet to be firebloated.

8. The process of making ceramic globules having non-communicating multi-cellular interiors and glassy exteriors, which comprises mixing about 86% of a fireclay containing about 60.10% $SiO_2$, about 24.40% $Al_2O_3$, about 2.15% $Fe_2O_3$, about .70% $TiO_2$, about 0.01% $P_2O_5$, about 0.20% CaO, about 0.04% MgO, about 1.57% $K_2O$, about 0.18% $Na_2O$, about 0.55% C, about 0.45% $SO_3$ and about 1.95% moisture, with about 8% dolomite and about 6% soda ash, reducing the size of the particles of said mixture to a size ranging from 14 mesh to air float, forming pellets of the mixture, subjecting the pellets to a temperature of 2300° F. to 2450° F. to fuse the material for a period of not more than 6 minutes to cause each pellet to be firebloated maintaining the pellets separated from each other on a bed of sand while at said temperature and immediately cooling below the fusion temperature.

9. The process of making ceramic globules having non-communicating multi-cellular interiors and glassy exteriors, which comprises mixing about 86% of a fireclay containing about 60.10% $SiO_2$, about 24.40% $Al_2O_3$, about 2.15% $Fe_2O_3$, about .70% $TiO_2$, about 0.01% $P_2O_5$, about 0.20% CaO, about 0.04% MgO, about 1.57% $K_2O$, about 0.18% $Na_2O$, about 0.55% C, about 0.45% $SO_3$ and about 1.95% moisture with about 8% dolomite including calcium and magnesium oxides present in the ratio of about one part magnesium oxide to about one and three-fourths parts calcium oxide and about 6% soda ash, reducing the size of the particles of said mixture to a size ranging from 14 mesh to air float, forming pellets of the mixture, subjecting the pellets to a temperature of from 2300° F. to 2450° F. for a period of from three to six minutes to cause each pellet to be firebloated with a glassy exterior.

10. The process of making ceramic globules having non-communicating multi-cellular interiors and glassy exteriors, which comprises mixing about 86% of a fireclay containing about 60.10% $SiO_2$, about 24.40% $Al_2O_3$, about 2.15% $Fe_2O_3$, about .70% $TiO_2$, about 0.01% $P_2O_5$, about 0.20% CaO, about 0.04% MgO, about 1.57% $K_2O$, about 0.18% $Na_2O$, about 0.55% C, about 0.45% $SO_3$ and about 1.95% moisture with about 8% dolomite including calcium and magnesium oxides present in the ratio of about one part magnesium oxide to about one and three-fourths parts calcium oxide and about 6% soda ash, reducing the size of the particles of said mixture to a size ranging from 14 mesh to air float, forming pellets of the mixture, subjecting the pellets to a temperature of from 2300° F. to 2450° F. for a period of from three to six minutes to cause each pellet to be fire-bloated with a glassy exterior and immediately cooling below 2200° F.

11. The process of manufacturing lightweight ceramic globules having non-communicating multi-cellular interiors and glassy exteriors, which comprises reducing a ceramic earth material consisting of from 50 to 75% by weight silica, from 12 to 35% by weight alumina, from 1 to 20% by weight chemically combined water, and from 10 to 18% by weight of fluxing oxides including calcium and magnesium oxides present in the ratio of about 1 part by weight magnesium oxide to about 1¾ parts by weight calcium oxide, to a particle size ranging from 14 mesh to air float, and in which the calcium and magnesium oxides are present in the ratio of 1 part by weight thereof to about 1¾ parts of the fluxing oxides, dampening, forming into a plurality of pellets, and firing a plurality of said pellets at a temperature of 2300° to 2450° F. for a period of 3 to 6 minutes to cause each pellet to be fire-bloated with a glassy exterior.

12. The process of manufacturing lightweight ceramic globlues having non-communicating multi-cellular interiors and glassy exteriors, which comprises reducing a ceramic earth material consisting of from 50 to 75% by weight silica, from 12 to 35% by weight alumina, from 1 to 20% by weight chemically combined water, and from 10 to 18% by weight of fluxing oxides including calcium and magnesium oxides present in the ratio of about 1 part by weight magnesium oxide to about 1¾ parts by weight calcium oxide, to a particle size ranging from 14 mesh to air float, and in which the calcium and magnesium oxides are present in the ratio of 1 part by weight thereof to about 1¾ parts of the fluxing oxides, dampening, forming into a plurality of pellets, placing a plurality of said pellets separated from each other on a rotating horizontal bed of sand maintained at a temperature of 2300° to 2450° F. for a period of not over 6 minutes to cause each pellet to be fire-bloated with a glassy exterior, rapidly cooling to below 2000° F. and removing the pellets from the bed of sand.

References Cited in the file of this patent

UNITED STATES PATENTS

| | | |
|---|---|---|
| 1,583,521 | Boynton | May 4, 1926 |
| 1,707,395 | Hayde | Apr. 2, 1929 |
| 1,850,221 | Wyatt et al. | Mar. 22, 1932 |
| 2,303,964 | Ungewiss | Dec. 1, 1942 |
| 2,430,601 | Cleary | Nov. 11, 1947 |
| 2,463,994 | Nichols et al. | Mar. 8, 1949 |
| 2,498,355 | Bomgren | Feb. 21, 1950 |
| 2,627,642 | Osborne | Feb. 10, 1953 |

FOREIGN PATENTS

| | | |
|---|---|---|
| 153,030 | Great Britain | 1920 |
| 627,523 | Great Britain | Aug. 10, 1949 |

OTHER REFERENCES

Hamlin et al.: Abstract of application 51,842, Mar. 20, 1951.